(12) United States Patent
Bonde et al.

(10) Patent No.: US 10,174,854 B2
(45) Date of Patent: Jan. 8, 2019

(54) HYDRAULIC OVERPRESSURE VALVE AND HYDRAULIC MACHINE

(71) Applicant: Danfoss Power Solutions ApS, Nordborg (DK)

(72) Inventors: Per Bonde, Sønderborg (DK); Mogens Frederiksen, Sydals (DK); Niels Bjarne Hansen, Aabenraa (DK); Nils E. Sevelsted, Sønderborg (DK); Bendt Porskrog, Nordborg (DK); Helle Bonde Rasmussen, Sønderborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 57 days.

(21) Appl. No.: 15/349,192

(22) Filed: Nov. 11, 2016

(65) Prior Publication Data
US 2017/0138492 A1    May 18, 2017

(30) Foreign Application Priority Data
Nov. 16, 2015 (EP) .................................. 15194778

(51) Int. Cl.
*F16K 17/04* (2006.01)
*F16K 47/04* (2006.01)
*F16K 15/02* (2006.01)

(52) U.S. Cl.
CPC ........ *F16K 17/0446* (2013.01); *F16K 15/026* (2013.01); *F16K 17/0433* (2013.01); *F16K 47/04* (2013.01)

(58) Field of Classification Search
CPC ............... F16K 15/026; F16K 17/0446; Y10T 137/7929
See application file for complete search history.

(56) References Cited

U.S. PATENT DOCUMENTS

| 4,842,015 A | * | 6/1989 | Haak ..................... F16K 15/026 137/535 |
| 5,265,943 A | | 11/1993 | Kehl et al. |
| 5,285,813 A | | 2/1994 | Quante et al. |
| 5,597,008 A | * | 1/1997 | Overdiek ............... B62D 5/062 137/15.18 |
| 6,938,641 B2 | | 9/2005 | Abe |

(Continued)

FOREIGN PATENT DOCUMENTS

| CN | 1811249 A | 8/2006 |
| CN | 104136821 A | 11/2014 |

(Continued)

*Primary Examiner* — Reinaldo Sanchez-Medina
*Assistant Examiner* — Nicole Gardner
(74) *Attorney, Agent, or Firm* — McCormick, Paulding & Huber LLP

(57) ABSTRACT

A hydraulic overpressure valve (1) is provided comprising a valve housing (2), a valve seat (3) located in said valve housing and having a seat center and a seat center axis (4), a cone element (5) movable relatively to said valve seat (3), said cone element (5) having a cone (6) protruding at least partly into said valve seat (3) and having a cone center axis (4), and force generating means acting on said cone element (5) in a direction towards said valve seat (3). Such a hydraulic overpressure valve should be operated with low noise. To this end said cone (6) is movable along a path of movement in which said cone center axis is kept outside said seat center axis (4).

13 Claims, 2 Drawing Sheets

(56) References Cited

U.S. PATENT DOCUMENTS

| | | | |
|---|---|---|---|
| 6,968,858 | B2 | 11/2005 | Kuehn et al. |
| 7,275,561 | B2 | 10/2007 | Kim et al. |
| 7,832,422 | B2 | 11/2010 | Endoh et al. |
| 2003/0172973 | A1 | 9/2003 | Abe |
| 2004/0007271 | A1 | 1/2004 | Kuehn et al. |

FOREIGN PATENT DOCUMENTS

| | | |
|---|---|---|
| EP | 1 686 299 A1 | 8/2006 |
| JP | H0861554 A | 3/1996 |
| JP | 2003074725 A | 3/2003 |

\* cited by examiner

HYDRAULIC OVERPRESSURE VALVE AND HYDRAULIC MACHINE

CROSS REFERENCE TO RELATED APPLICATION

Applicant hereby claims foreign priority benefits under U.S.C. § 119 from European Patent Application No. EP15194778.5 filed on Nov. 16, 2015, the content of which is incorporated by reference herein.

TECHNICAL FIELD

The present invention relates to a hydraulic overpressure valve comprising a valve housing, a valve seat located in said valve housing and having a seat center and a seat center axis, a cone element moveable relative to said valve seat, said cone element having a cone protruding at least partly into said valve seat and having a cone center axis, and force generating means acting on said cone element in a direction towards said valve seat.

Furthermore, the invention relates to a hydraulic machine comprising such an overpressure valve.

BACKGROUND

Such a hydraulic overpressure valve is usually used to limit a hydraulic pressure in a hydraulic machine or a hydraulic system. When the hydraulic pressure increases to exceed a predetermined threshold value the cone element is loaded by the pressure against the force of the force generating means. When the force produced by the hydraulic pressure exceeds the force produced by the force generating means the cone element is moved away from the valve seat and the cone opens a passage so that hydraulic fluid can escape and the pressure in the system decreases. A pressure reducing valve operates in a similar manner. Therefore, the term overpressure valve incorporates a pressure reducing valve as well for this description. Such an overpressure valve has a tendency to be noisy. This is a problem in particular in hydraulic machines and hydraulic systems which are operated near a human operator, for example in a vehicle equipped with a hydraulic steering unit in which such an overpressure valve is built in.

SUMMARY

The problem underlying the present invention is to have an overpressure valve producing small noise.

This object is solved with a hydraulic overpressure valve as described at the outset in that said cone is moveable along a path of movement in which said cone center axis is kept outside said seat center.

In such a construction the risk of producing excessive noise is reduced since the tendency of the cone element to swing is reduced as well. When the risk of swinging of the cone element is reduced, the risk that the cone hits the valve seat or the surrounding walls is generally reduced as well and therefore the production of noise can be kept small. In an ideal case, the valve does not make any noise. The valve housing can be an individual element or it can be part of a housing block of a hydraulic machine. The valve seat can as well be a separate or individual part or it may be part of the valve housing or of the machine block, i.e. a housing of a hydraulic machine, like a hydraulic steering unit.

Preferably a ring gap is provided between said cone element and said housing. The cone element is not guided in any way in the housing.

In a preferred embodiment said cone is loaded with a lateral force perpendicular to said cone center axis. This lateral force acts on the cone element and via the cone element on the cone in a direction perpendicular to the cone center axis. This lateral force moves the cone element with its axis out of the center of the valve seat and prevents the formation of a swinging movement of the cone within the valve seat.

Preferably said lateral force is generated by said force generating means. The force generating means have two tasks. The one is to produce a restoring force moving the cone element back to the valve seat when the pressure has sufficiently decreased. The other task is to produce the lateral forces.

Preferably said force generating means comprise at least a spring. A spring is a rather simple means for producing the required forces.

Preferably an arrangement of said spring and said cone element is asymmetric with respect to said cone center axis. An asymmetric arrangement is a simple construction to produce the lateral forces on the cone element without additional spring elements.

In a preferred embodiment said spring comprises two end faces, one of said two end faces resting against the first spring support area of said cone element and the other one of said two end faces resting against a second spring support area located in said valve housing, wherein at least one of said two end faces and said spring supporting areas deviates from a plane which is perpendicular to said seat center axis. In prior art valves a spring is used in which the two end faces are machined to be parallel and they act on spring support areas which are parallel as well. Now this construction is amended to produce at least one location in which a "slanted force" is generated which is used to act on the cone element perpendicular to the seat center axis.

Preferably one of said end faces and said spring support areas is slanted relative to said plane. This means that the force generated by the spring has one component which is directed towards the valve seat and one component which is directed perpendicular to the seat center axis. This is a simple way to produce the lateral force.

In a preferred embodiment which can be used alternatively or additionally to the slanted end faces and/or spring support areas is that at least one of said end faces and said spring support areas has a form different from a plane. When, for example, the spring is in form of a screw spring and the end face is not in form of a plane, the spring contacts the cone element not along the entire circumference of the spring so that a force from the spring to the cone element is in the same way not transmitted uniformly over the entire circumference of the spring. When the force is not uniform over the entire circumference of the spring the cone element can change the orientation with respect to the seat center and the seat center axis. This change of the orientation can be relatively small. It is sufficient when a small lateral force is produced.

In a preferred embodiment at least one of said end faces and said spring support areas has a recess area. The recess area forms a gap in which no force is transferred from the spring to the cone element.

In a preferred embodiment said recess area is grinded. Grinding is a relative simple method for producing the recess area.

In a preferred embodiment said recess area extends in circumferential direction over less than 180°, preferably over 100° or less and in particular over 50°±20°. This is sufficient to allow the cone element to tilt a bit more to move with the cone center axis outside the seat center axis.

The present invention relates to a hydraulic machine comprising such a hydraulic overpressure valve. In this case the hydraulic machine can be operated with low noise.

In a preferred embodiment said hydraulic machine is a hydraulic steering unit. The hydraulic steering unit is generally used in a vehicle which is man operated. The comfort feeling of the driver is increased.

BRIEF DESCRIPTION OF THE DRAWINGS

Preferred embodiments of the invention will now be described in more detail with reference to the drawing, wherein.

DETAILED DESCRIPTION

Figure 1:
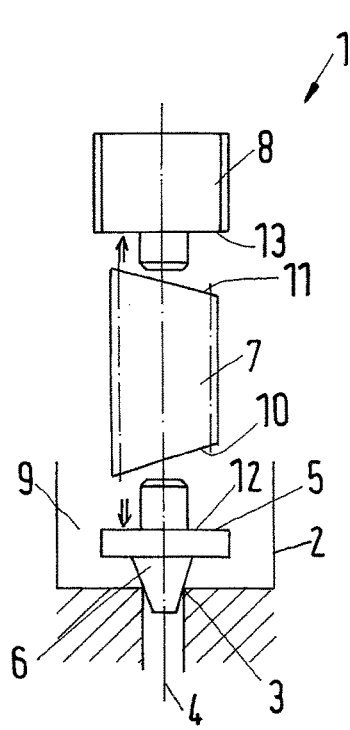
FIG. 1 shows a first embodiment of a hydraulic overpressure valve.

FIG. 1 shows schematically an overpressure valve 1 comprising a housing 2 and a valve seat 3 located in said valve housing 2. The valve seat 3 has a seat axis 4 running through a seat center.

A cone element 5 comprises a cone 6. The cone 6 protrudes partly into the valve seat 3. The cone element 5 has a cone axis which is not shown separately.

Force generating means comprising a spring 7 act onto the cone element 5 in a direction towards the valve seat 3. The spring 7 is located between the cone element 5 and a plug 8 which is mounted in the housing 2. The respective parts are shown exploded for the sake of clarity.

A ring gap 9 is provided between the cone element 5 and the housing 2. The cone element 5 and the cone 6 are not guided.

The spring 7 comprises a first end face 10 and a second end face 11. When the parts shown are assembled correctly, the spring 7 contacts a first spring support area 12 on the cone element 5 and a second spring support area 13 on the plug 8.

In the embodiment of the hydraulic overpressure valve 1 shown in FIG. 1 the two end faces 10, 11 form an angle with a theoretical plane which is perpendicular to the seat axis 4. In other words, the end faces 10, 11 are not perpendicular to the seat axis 4.

This has the effect that the cone element 5 is loaded with a greater force on the left hand side (as shown in FIG. 1) than on the right hand side so that when the cone element 5 is lifted from the valve seat 3 and the cone is moved in a direction out of the valve seat 3 there is a lateral force acting on the cone element moving the cone center axis out of the seat center axis.

The inclination of the end faces 10, 11 is in reality not as big as that shown in FIG. 1. FIG. 1 shows a large angle for the sake of clarity.

The spring with the slanted end faces 10, 11 produces a lateral force which is perpendicular to the cone center axis to press and move the cone element 5 out of a center position with respect to the valve seat 3. This is simple be realized by means of an asymmetric construction of the arrangement of spring 7 and cone element 5.

Basically it would be sufficient to have only one of the end faces 10, 11 slanted.

The two end faces 10, 11 are slanted or inclined in opposite directions.

Figure 2:
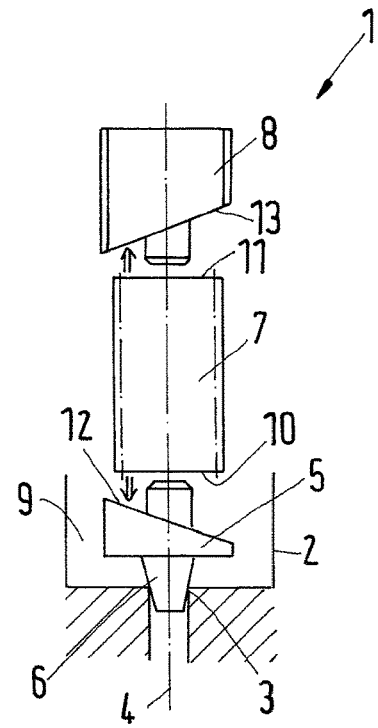
FIG. 2 shows a second embodiment of a hydraulic overpressure valve.

FIG. 2 shows a second embodiment in which the elements described in connection with FIG. 1 are designated with the same reference numerals. In this embodiment the two end faces 10, 11 of the spring 7 are parallel to each other and are perpendicular to the seat axis 4.

In order to produce the lateral forces onto the cone element 5 the spring support areas 12, 13 are inclined with respect a plane which is perpendicular to the seat axis 4 producing the same effect as the inclined end faces 10, 11 shown in FIG. 1.

Figure 4:
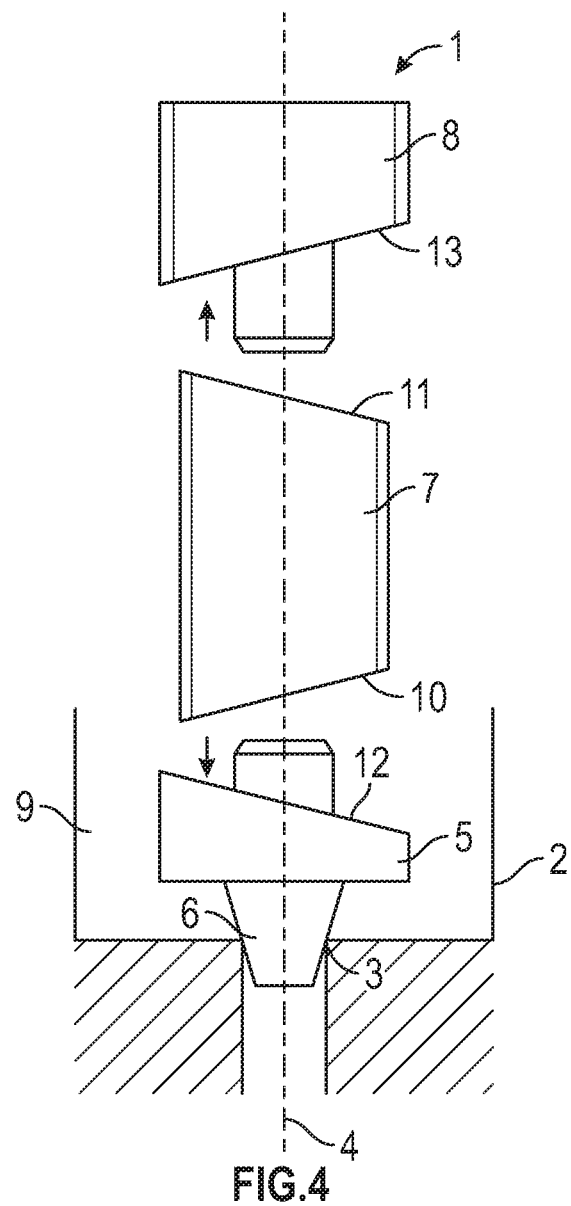
FIG. 4 shows a fourth embodiment of a hydraulic overpressure valve.

It is possible to combine the two embodiments of FIGS. 1 and 2, i.e. to have one or two inclined end faces 10, 11 and one or two spring support areas 12, 13. As shown in FIG. 4, in this case the end face 10 and the corresponding spring support area 12 should be inclined in opposite directions and the end face 11 and the spring support area 13 should be inclined in opposite directions as well. The inclination of the spring support areas 12, 13 is opposite as well.

Figure 3:
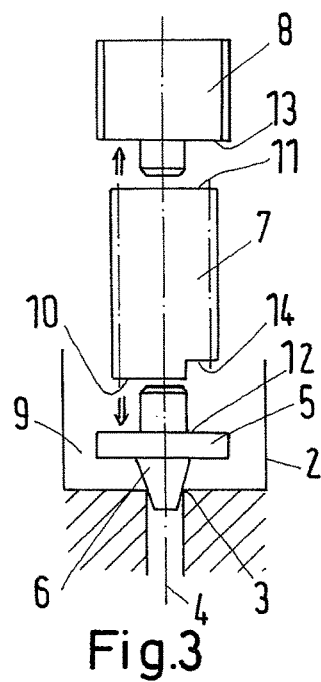
FIG. 3 shows a third embodiment of a hydraulic overpressure valve.

FIG. 3 shows another embodiment of a hydraulic overpressure valve in which elements which have been described in connection with FIGS. 1 and 2 are designated with the same reference numerals.

The asymmetric construction of the arrangement of spring 7 and cone element 5 is realized in this case by a recess area 14 formed in the end face 10 of spring 7. This recess area 14 can be produced by grinding. The recess area 14 extends in circumferential direction over less than 180°, preferably over 100° or less. In particular preferred embodiment it extends over 50°±20°.

When such a recess area 14 is provided, the corresponding end face 11 does no longer have the form of a plane. The plane is disturbed by the recess area 14. Although not shown, it is possible that both end faces 10, 11 are provided with a recess area 14.

It can also be the case that a recess area is provided in the spring support areas 12, 13 in such a way that the spring 7 does not contact the cone element 5 or the plug 8 in the recess area 14.

Such a hydraulic overpressure valve can preferably be used in a hydraulic machine, in particular in a hydraulic steering unit. It can be used to reduce or limit a full hydraulic pressure or to reduce or limit a pilot pressure.

While the present disclosure has been illustrated and described with respect to a particular embodiment thereof, it should be appreciated by those of ordinary skill in the art that various modifications to this disclosure may be made without departing from the spirit and scope of the present disclosure.

The invention claimed is:

1. A hydraulic overpressure valve comprising:
   a valve housing;
   a valve seat located in said valve housing and having a seat center and a seat center axis;
   a cone element movable relative to said valve seat, said cone element having a cone protruding at least partly into said valve seat and having a cone center axis; and
   force generating means acting on said cone element in a direction towards said valve seat, wherein said cone is movable along a path of movement in which said cone center axis is kept outside said seat center axis;

wherein said force generating means comprise at least a spring;

wherein an arrangement of said spring and said cone element produces lateral forces on said cone element with respect to said cone center axis;

wherein said spring comprises two ends faces, one of said two end faces resting against a first spring support area of said cone element and the other one of said two end faces resting against a second spring support area located in said valve housing; and wherein said two end faces and said first and second spring supporting areas deviate from a plane which is perpendicular to said seat center axis.

2. The valve according to claim 1 wherein said cone is loaded with a lateral force perpendicular to said cone center axis.

3. The valve according to claim 2, wherein said lateral force is generated by said force generating means.

4. The valve according to claim 1, wherein an arrangement of said spring and said cone element producing lateral forces on said cone element with respect to said cone center axis.

5. The valve according to claim 4, wherein at least one of said end faces and said spring support areas is slanted relative to said plane.

6. The valve according to claim 5, wherein at least one of said end faces and said spring support areas has a form different from a plane.

7. The valve according to claim 4, wherein at least one of said end faces and said spring support areas has a form different from a plane.

8. The valve according to claim 7, wherein at least one of said end faces and said spring support areas has a recess area.

9. The valve according to claim 8, wherein said recess area extends in circumferential direction up to 180°.

10. The valve according to claim 8 wherein said recess area is grinded.

11. The valve according to claim 10, wherein said recess area extends in circumferential direction up to 180°.

12. A hydraulic machine comprising a hydraulic overpressure valve according to claim 1.

13. The hydraulic machine according to claim 12, wherein said hydraulic machine is a hydraulic steering unit.

* * * * *